US008145676B2

(12) United States Patent
Bhogal et al.

(10) Patent No.: US 8,145,676 B2
(45) Date of Patent: Mar. 27, 2012

(54) SHARED INVENTORY ITEM DONATION IN A VIRTUAL UNIVERSE

(75) Inventors: Kulvir S. Bhogal, Forth Worth, TX (US); Rick Allen Hamilton, II, Charlottesville, VA (US); Clifford Alan Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 12/029,194

(22) Filed: Feb. 11, 2008

(65) Prior Publication Data

US 2009/0204628 A1      Aug. 13, 2009

(51) Int. Cl.
*G06F 17/30* (2006.01)
(52) U.S. Cl. .............. 707/802; 707/E17.044; 705/28; 463/25; 463/29; 463/43
(58) Field of Classification Search ........... 707/999.102, 707/102, E17.044, 802; 705/28; 463/25, 463/29, 43
See application file for complete search history.

(56) References Cited

U.S. PATENT DOCUMENTS

| | | | |
|---|---|---|---|
| 5,615,373 A | 3/1997 | Ho | |
| 6,476,830 B1 | 11/2002 | Farmer et al. | |
| 6,753,857 B1 | 6/2004 | Matsuura et al. | |
| 6,941,184 B2 | 9/2005 | Ebert | |
| 7,069,228 B1 | 6/2006 | Rose et al. | |
| 7,257,552 B1 | 8/2007 | Franco | |
| 7,277,896 B2 | 10/2007 | Matsubara et al. | |
| 7,587,338 B2 | 9/2009 | Owa | |
| 7,666,095 B2 | 2/2010 | Van Luchene | |
| 7,713,116 B2 | 5/2010 | Keam et al. | ........................ 463/1 |
| 8,018,462 B2 | 9/2011 | Bhogal et al. | |
| 2002/0002541 A1* | 1/2002 | Williams | ........................ 705/51 |

(Continued)

FOREIGN PATENT DOCUMENTS
WO      9607151 A1      3/1996

OTHER PUBLICATIONS

Ortiz Roman, Denisse Y., Final Office Action; mail date Nov. 27, 2009; published by the USPTO in U.S. Appl. No. 12/028,918, pp. 14.

(Continued)

*Primary Examiner* — Tim T Vo
*Assistant Examiner* — Shiow-Jy Fan
(74) *Attorney, Agent, or Firm* — Schmeiser, Olsen & Watts; Mark Vallone

(57) ABSTRACT

Generally speaking, systems, methods and media for managing donations of shared inventory items in a virtual universe are disclosed. Embodiments of the method may include receiving a request to make available for donation a shared inventory item list that can be borrowed simultaneously by a plurality of users of a virtual universe where the request includes an indication of donation conditions for the donated shared inventory item. Embodiments may also include generating and storing metadata associated with the donated shared inventory item and receiving a request from a plurality of users to borrow the item. Embodiments may include lending the donated shared inventory item to the plurality of borrowing users such that multiple users are borrowing the item simultaneously. Embodiments may also include tracking usage of the donated shared inventory item by the plurality of borrowing users and optionally determining a donation amount resulting from the tracked usage.

21 Claims, 6 Drawing Sheets

U.S. PATENT DOCUMENTS

| | | | |
|---|---|---|---|
| 2002/0029179 A1* | 3/2002 | Gruber et al. | 705/35 |
| 2002/0052756 A1* | 5/2002 | Lomangino | 705/1 |
| 2002/0059120 A1 | 5/2002 | Milton | |
| 2002/0107701 A1* | 8/2002 | Batty et al. | 705/1 |
| 2005/0021353 A1* | 1/2005 | Aviles et al. | 705/1 |
| 2005/0261980 A1 | 11/2005 | Hadi | |
| 2007/0033279 A1 | 2/2007 | Battat et al. | |
| 2007/0052702 A1 | 3/2007 | Trotta et al. | |
| 2007/0075993 A1 | 4/2007 | Nakanishi et al. | |
| 2007/0118420 A1 | 5/2007 | Jung et al. | |
| 2008/0022137 A1 | 1/2008 | Ginter et al. | 713/194 |
| 2008/0109910 A1* | 5/2008 | Day et al. | 726/27 |
| 2008/0204448 A1 | 8/2008 | Dawson et al. | |
| 2009/0158161 A1 | 6/2009 | Gibbs et al. | 715/733 |

OTHER PUBLICATIONS

Kulvir S. Bhogal et al., U. S. Patent Application entitled "Maintenance of Group Shared Inventories in a Virtual Universe,", filed Feb. 11, 2008, U.S. Appl. No. 12/028,918.

Kulvir S. Bhogal et al., U. S. Patent Application entitled "Maintenance of Group Shared Inventories in a Virtual Universe,", filed Feb. 15, 2008, U.S. Appl. No. 12/032,464.

Kulvir S. Bhogal et al., U. S. Patent Application entitled "Pack Avatar for Shared Inventory in a Virtual Universe,", filed Feb. 11, 2008, U.S. Appl. No. 12/029,132.

Kulvir S. Bhogal et al., U. S. Patent Application entitled "Tracking of Shared Inventory in a Virtual Universe;", filed Feb. 15, 2008, U.S. Appl. No. 12/032,488.

Ortiz Roman, Denisse Y., Non-Final Office Action: mail date Aug. 10, 2009; published by the USPTO in U.S. Appl. No. 12/028,918, pp. 17.

Champagne, Luna, Non-Final Office Action; mail date May 11, 2010; published by the USPTO in U.S. Appl. No. 12/032,464, pp. 18.

Ortiz Roman, Denisse Y., Non-Final Office Action: mail date Apr. 16, 2010; published by the USPTO in U.S. Appl. No. 12/028,918, pp. 16.

Kulvir S. Bhogal et al., Amendment Accompanying RCE, mail date Feb. 23, 2010, published by Applicants in U.S. Appl. No. 12/028,918, pp. 13.

Applicant's attorney Erik Osterrieder, Response to Non-Final Office Action of U.S. Appl. No. 12/028,918, Jul. 12, 2010, Austin, TX, USA.

Final Office Action of U.S. Appl. No. 12/028,918, Aug. 5, 2010, Alexandria, VA, USA.

Office Action (Mail Date Jan. 7, 2011) for U.S. Appl. No. 12/029,132, filed Feb. 11, 2008; Confirmation No. 8207.

Final Office Action of U.S. Appl. No. 12/028,918, Aug. 5, 2010, USPTO, Alexandria, VA, USA.

Jeffrey Schubert, Preliminary Amendment, U.S. Appl. No. 12/028,918, Nov. 5, 2010, Austin, TX, USA.

Non-Final Office Action of U.S. Appl. No. 12/029,132, Feb. 11, 2011, USPTO, Alexandria, VA, USA.

Final Office Action of U.S. Appl. No. 12/032,464, Sep. 28, 2010, USPTO, Alexandria, VA, USA.

Jeffrey Schubert, Preliminary Amendment, U.S. Appl. No. 12/032,464, Jan. 27, 2011, Austin, TX, USA.

Non-Final Office Action of U.S. Appl. No. 12/032,488, Aug. 18, 2010, USPTO, Alexandria, VA, USA.

Jeffrey Schubert, Response to Non-Final Office Action, U.S. Appl. No. 12/032,488, Nov. 18, 2010, Austin, TX, USA.

Notice of Non-Complaint Amendment of U.S. Appl. No. 12/032,488, Feb. 4, 2011, USPTO, Alexandria, VA, USA.

Blizzard Entertainment: World of Warcraft (Internet Archived Content: Guild Banks found at www.worldofwarcraft.com/info/basics/guildbanks.html) dated Feb. 4, 2008.

Office Action (Mail Date May 10, 2011) for U.S. Appl. No. 12/032,464, filed Feb. 15, 2008; Confirmation No. 4425.

Notice of Allowance (Mail Date May 5, 2011) for U.S. Appl. No. 12/029,132, filed Feb. 11, 2008; Confirmation No. 8207.

Final Office Action (Mail Date May 17, 2011) for U.S. Appl. No. 12/032,488, filed Feb. 15, 2008; Confirmation No. 4465.

Notice of Allowance (Mail Date Sep. 16, 2011) for U.S. Appl. No. 12/032,464, filed Feb. 15, 2008; Confirmation No. 4425.

Advisory Action (Mail Date Aug. 16, 2011) for U.S. Appl. No. 12/032,488, filed Feb. 15, 2008; Confirmation No. 4465.

Notice of Appeal (Filed Sep. 16, 2011) for U.S. Appl. No. 12/032,488, filed Feb. 15, 2008; Confirmation No. 4465.

* cited by examiner

SHARED INVENTORY ITEM DONATION IN A VIRTUAL UNIVERSE

FIELD OF INVENTION

The present invention is in the field of data processing systems and, in particular, to systems, methods and media for managing donations of shared inventory items in a virtual universe.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the Internet or other broad-based network in order to communicate with other computer systems, access information or other resources, or perform various tasks associated with business, personal banking, electronic commerce transactions, or other endeavors.

One application for computer systems that is increasing in importance is for use in accessing virtual universes (VUs), which are also known as virtual worlds and virtual world environments (VWEs). A VU represents a real or imaginary place using graphics, images, video, auditory data, or other sensory data to define a representation on a computer system to one or more users. The hardware and software that together create a VU provide the ability for users to interact with the VU in various ways. VUs commonly allow for multiple users to simultaneously interact with the VU, allowing the users to thus interact with each other within the VU and form a community. Current VUs such as Second Life® by Linden Lab or There® by Makena Technologies provide an interactive, three-dimensional (3D) online digital world with hundreds of thousands of users accessing the world via the Internet. In these graphical VUs, users typically are represented by an avatar within the online world, and the users may command their avatar to move within the VU, communicate with other users via their avatars, etc., and thus interact with the virtual world. VUs typically allow users (using a client program on their computer system) to use various tools to view, navigate, and modify the virtual world as well as participate in its virtual economy.

VU users typically have an inventory of items that they own, and these inventory items may be bought, sold, traded, etc, during operation of the VU. Items in a typical inventory may include clothing, virtual pets, vehicles, electronic media (e.g., music files), or other possessions. Each inventory item may represent a piece of code or other data which may be rendered in some fashion to the user during a session in the VU. Clothing inventory, for example, may be rendered as clothing for the user's avatar while a virtual dog, in another example, may render as an automated avatar that follows the user's avatar within the VU. The contents of a user's inventory are typically displayed in a hierarchical manner similar to an operating system's display of folders, subfolders, and files within a filesystem.

The current use of inventories within a VU is limited. Individuals must typically manage their own inventories, manually adding or deleting inventory items from their inventory. Also, since each inventory item often has software code necessary to render it, the stored code results in significant storage and maintenance requirements within the VU as each instance of code is stored separately. The cost of purchasing or otherwise acquiring many inventory items is also sometimes prohibitive for many users. Another problem with current inventory systems is that sharing of inventory items is not available. A user wishing to loan an inventory item to another, for example, loses control of that item, making such a loan undesirable in many cases. For items such as artwork, the owner may want to retain some control over the item. For other items where control is not as important, a copy of an item can sometimes be made in order to facilitate exchange of items but this may result in excessive use of VU resources. The lack of sharing may thus exacerbate the storage problems associated with inventory items as the code must be stored for each individual user. Managing inventories has thus become a major problem in VU space as such inventories are increasingly taken up by functional software, documents, and other such items that today reside on local drives.

SUMMARY OF THE INVENTION

The problems identified above are in large part addressed by systems, methods and media for managing donations of shared inventory items in a virtual universe. Embodiments of the method may include receiving a request to make available for donation a shared inventory item list that can be borrowed simultaneously by a plurality of users of a virtual universe where the request includes an indication of donation conditions for the donated shared inventory item. Embodiments may also include generating and storing metadata associated with the donated shared inventory item and receiving a request from a plurality of users to borrow the donated shared inventory item. Embodiments may also include lending the donated shared inventory item to the plurality of borrowing users such that multiple, users are borrowing the donated shared inventory item simultaneously. Embodiments may also include tracking usage of the donated shared inventory item by the plurality of borrowing users and optionally determining a donation amount resulting from the tracked usage of the donated shared inventory item.

Another embodiment provides a computer program product comprising a computer-useable medium having a computer readable program wherein the computer readable program, when executed on a computer, causes the computer to perform a series of operations for managing donations of shared inventory items in a virtual universe. The series of operations generally includes receiving a request to make available for donation a shared inventory item list that can be borrowed simultaneously by a plurality of users of a virtual universe where the request includes an indication of donation conditions for the donated shared inventory item. Embodiments may also include a series of operations for generating and storing metadata associated with the donated shared inventory item and receiving a request from a plurality of users to borrow the donated shared inventory item. Embodiments may also include a series of operations for lending the donated shared inventory item to the plurality of borrowing users such that multiple users are borrowing the donated shared inventory item simultaneously. Embodiments may also include a series of operations for tracking usage of the donated shared inventory item by the plurality of borrowing users and optionally determining a donation amount resulting from the tracked usage of the donated shared inventory item.

A further embodiment provides a data processing system having a machine-accessible medium storing a plurality of program modules. Embodiments may include a content provider interface module to receive requests to make available for donation one or more shared inventory items that can each be borrowed simultaneously by a plurality of users of a virtual universe, where the request includes an indication of donation conditions for each donated shared inventory item. Embodiments may also include a donor module having a content tagging module to generate and store metadata associated with donated shared inventory items and a user interface module to receive requests from users to borrow donated shared inventory items. Embodiments may also include a user module to lend donated shared inventory items to borrowing users who request particular donated shared inventory items, where the user module includes a tracking module to track usage of the donated shared inventory items by borrowing users and to optionally determine a donation amount resulting from tracked usage of donated shared inventory items.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

Figure 1:
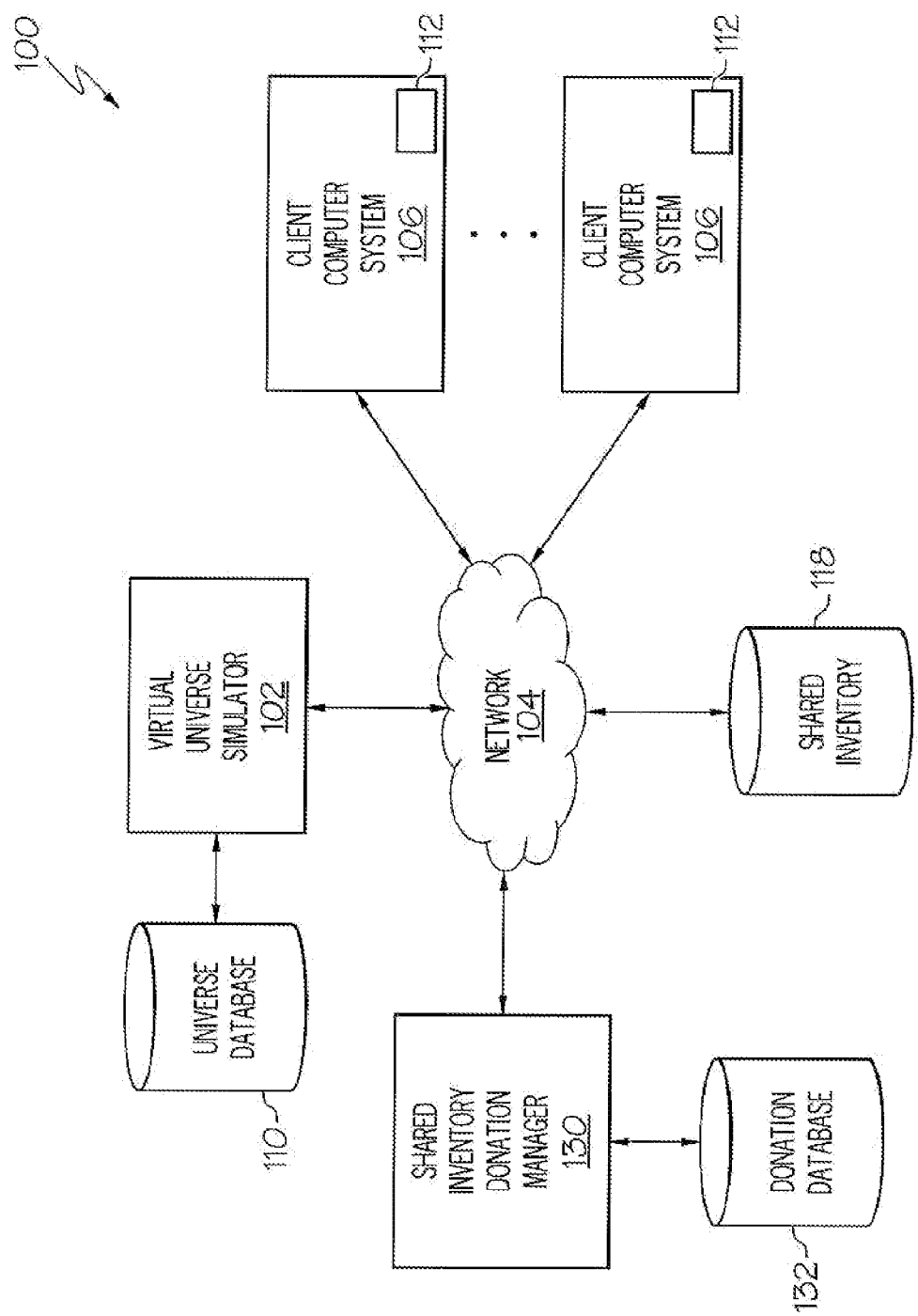
FIG. 1 depicts a shared inventory donation system with a virtual universe simulator, one or more client computer systems, and a shared inventory donation manager according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for managing donations of shared inventory items in a virtual universe are disclosed. Embodiments of the method may include receiving a request to make available for donation a shared inventory item list that can be borrowed simultaneously by a plurality of users of a virtual universe where the request includes an indication of donation conditions for the donated shared inventory item. Embodiments may also include generating and storing metadata associated with the donated shared inventory item and receiving a request from a plurality of users to borrow the donated shared inventory item. Embodiments may also include lending the donated shared inventory item to the plurality of borrowing users such that multiple users are borrowing the donated shared inventory item simultaneously. Embodiments may also include tracking usage of the donated shared inventory item by the plurality of borrowing users and optionally determining a donation amount resulting from the tracked usage of the donated shared inventory item.

The system and methodology of the depicted embodiments allow for effective and efficient management of donations of shared inventory in a virtual universe. By allowing for entities to offer inventory items for donation via shared inventory items, a flexible inventory item donation system may be provided. The use of a donated shared inventory item may be tracked and the tracking information may be used to determine the appropriate donation. A corporation may, for example, provide a bracelet inventory item that can be shared by multiple users in a virtual universe. For each user that uses the bracelet (or is wearing the bracelet at a certain time each day, or any other tracking mechanism), the corporation may donate one dollar to a charitable organization. By providing a mechanism to implement and track the shared usage of donated items, the disclosed system may provide efficient donations by donors, a desirable feature for a virtual universe, and a way for virtual universe users to donate to what they deem worthy causes.

In general, the routines executed to implement the embodiments of the invention may be part of a specific application, component program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Moreover, embodiments of the invention may also be implemented via parallel processing using a parallel computing architecture, such as one using multiple discrete systems (e.g., plurality of computers, etc.) or an internal multiprocessing architecture, (e.g., a single system with parallel processing capabilities).

Aspects of embodiments of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts a shared inventory donation, system 100 with a virtual universe simulator 102, one or more client computer systems 106, and a shared inventory donation manager 130 according to some embodiments. In the depicted embodiment, the shared inventory system donation system 100 includes a virtual universe simulator 102 in communication with a plurality of client computer systems 106 via network 104. The virtual universe simulator 102 and client computer systems 106 may also be in communication with a shared inventory donation manager 130 via network 104. Shared inventory items (i.e., shareable inventory items that may be offered for donation to multiple users) may be stored in a variety of possible inventory sources, including a universe database 110, a donation database 132, as part of a client computer system 106, or other location. As will be described in more detail subsequently, a virtual universe simulator 102 may manage a virtual universe (VU) by interacting with a variety of users of client computer systems 106 and the shared inventory donation manager 130 may facilitate management of donated shared inventory items that are borrowed by users of the client computer systems 106.

Inventory items may be any item that may be associated with a user in a virtual universe. Inventory items may each be comprised of one or more files, be part of a larger database, or be stored in any other fashion. In some embodiments, an inventory item may be a piece of software code that is renderable in a virtual universe. In other embodiments, inventory items may be represented as non-executable data that may be used by the VU to render the inventory item for the user when needed. Non-limiting examples of inventory items include graphics files, sound files, animations, electronic documents, video files, avatar clothing or accessories, avatar body parts, avatar tools or vehicles or other objects, avatar gestures, automated avatars, calling cards, landmarks (such as bookmarked locations) or other geographical information, items in a lost and found folder, note cards, photos and photo albums, scripts (e.g., macros to perform actions), textures, deleted items, or any other type of item. One of ordinary skill in the art will recognize that inventory items may include executable code, non-executable data, or any other type of information, and may also represent any type of item within a VU.

Virtual universe simulator 102 may be implemented on one or more servers or other computer systems (such as those described in relation to FIG. 2) adapted to implement all or part of a virtual universe. The virtual universe simulator 102 may be implemented, for example, on one or more application servers such as International Business Machine's (IBM®'s). WebSphere® Application Server (WAS) that may serve as middleware to set up, operate, and integrate e-business applications across multiple computing platforms using Web technologies. The virtual universe simulator 102 may provide a virtual universe to users by accessing stored information from a database and creating and operating a virtual universe based on the stored information. To accomplish this, the virtual universe simulator 102 may render the virtual universe, including a user's inventory items, on the client computer system 106 so that the user can view or otherwise experience the virtual universe. An example virtual universe simulator 102 may include massively multiplayer online games such as the Second Life® virtual world from Linden Lab or There® by Makena Technologies.

A virtual universe simulator 102 may also have a universe database 110 to store a variety of files used to create, maintain, and operate a virtual universe (collectively "environment information"), such as graphics flies (e.g., buildings, avatars, landscapes, items, etc.), sound files (e.g., environmental sounds, spoken words, etc.), or text, files (e.g., configuration information, descriptive information for objects, user information, etc.). The universe database 110 may also store shared inventory items and/or information relating to shared inventory items, such as item metadata. Shared inventory items, much like traditional inventory items, may be rendered within a virtual universe. The universe database 110 may be stored on any type or combination of storage devices, including volatile or non-volatile storage such as hard drives, storage area networks, memory, fixed or removable storage, or other storage devices.

Users may utilize a client computer system 106 according to the present embodiments to access the virtual universe simulator 102 (and thus the virtual universe) via network 104. Client computer system 106 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. A user of the client computer system 106 may utilize a VU interface 112 to interact with the VU operated by the virtual world simulator 102. VU interface 112 may be dedicated client software provided by the VU operator in some embodiments or it may alternatively be existing general software such as a browser.

Network 104 may be any type of data communications channel or combination of channels, such as the Internet, an intranet, a LAN, a WAN, an Ethernet network, a wireless network, telephone network, a proprietary network, or a broadband cable network. In one example, the Internet may serve as network 104 and the client computer systems 106, the shared inventory donation manager 130, and the virtual universe simulator 102 may communicate via the Internet using known protocols. Those skilled in the art will recognize, however, that the invention described herein may be implemented utilizing any type or combination of data communications channel(s) without departure from the scope and spirit of the invention.

Figure 3:
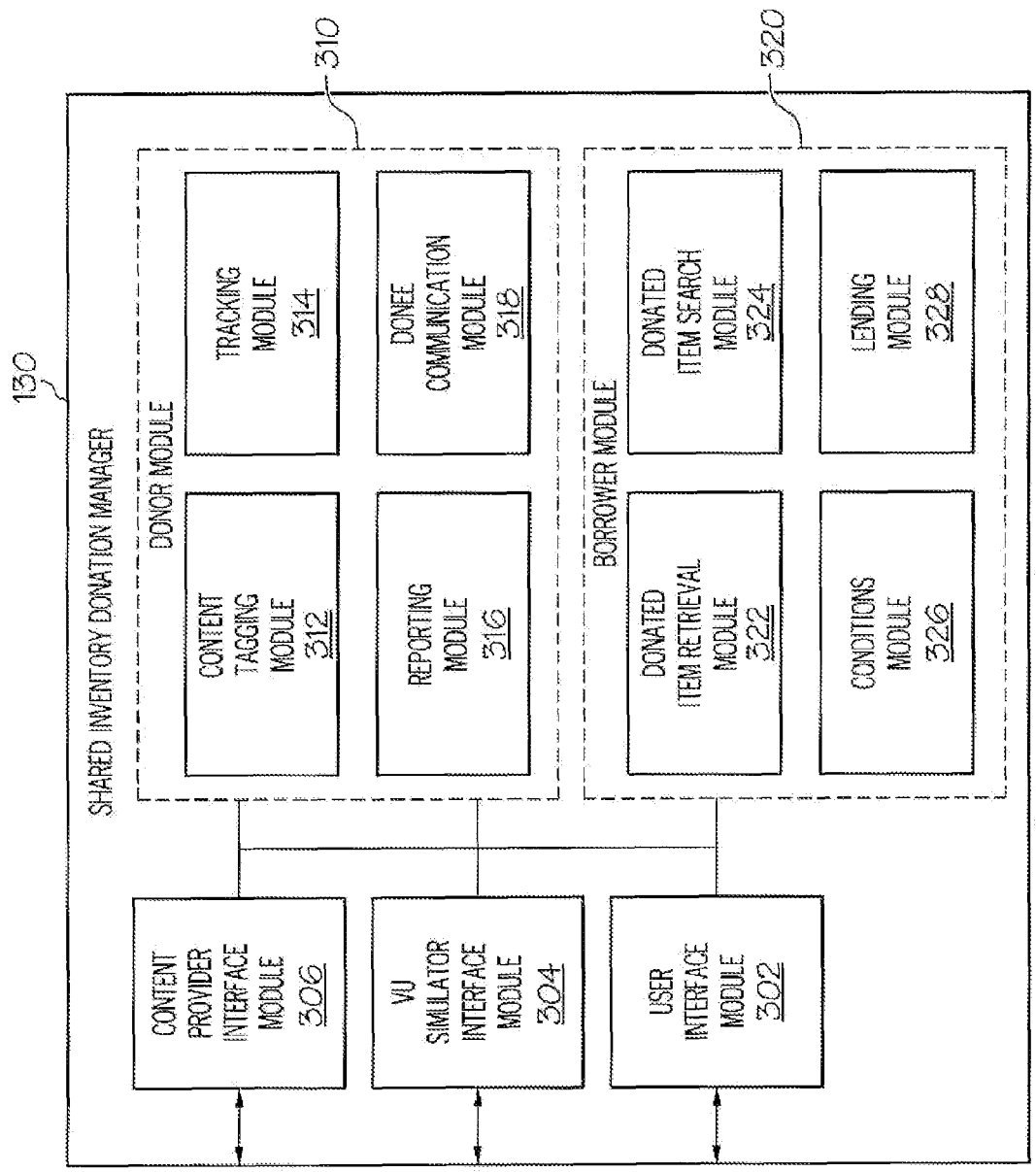
FIG. 3 depicts a conceptual illustration of software components of a shared inventory donation manager according to some embodiments.

The shared inventory donation manager 130, which is described in more detail in relation to FIG. 3, may provide for management of donations of shared inventory items within the shared inventory donation system 100. The shared inventory donation manager 130 may receive requests to make shared inventory items available for donation where each shared inventory item can be borrowed simultaneously by a plurality of users in a VU. The requests may include an indication of donation conditions for each item, such as limits on which users can borrow the item, how long they may borrow the item, the charitable contribution associated with types of borrowing, or other conditions. The shared inventory donation manager 130 may also generate and store metadata associated with the donated items. The shared inventory donation manager 130 may also receive requests from users to borrow donated shared inventory items and may lend the shared items to the requesting users as appropriate. The shared inventory donation manager 130 may also track usage of the donated shared inventory items by borrowing users and may use the tracking to determine a donation amount resulting from tracked usage of the donated shared inventory items. The shared inventory donation manager 130 may in further embodiments communicate with various entities, such as by notifying users that a particular item is available or that a donation has been made, transmitting indications of determined donations to donee organizations or taxing entities, etc.

The optional donation database 132 may store donated shared inventory items and/or information relating to donated shared inventory items, such as item metadata or item usage information, for use by the shared inventory donation manager 130. The donation database 132 may be stored on any type or combination of storage devices, including volatile or non-volatile storage such as hard drives, storage area networks, memory, fixed or removable storage, or other storage devices. The donation database 132 may be wholly or partially a separate database from the universe database 110 or it may alternatively be integrated into the universe database 110.

The shared inventory donation system 100 may use any methodology to implement sharing of donated inventory items. In some embodiments, the shared inventory donation manager 130 itself may implement an inventory item sharing system that allows multiple users to simultaneously borrow a particular inventory item. In other embodiments, a virtual inventory manager (not shown) may be implemented to manage shared inventory items by facilitating the copying of a file from an inventory source to the virtual universe simulator when the shared inventory item is requested. In these embodiments, the virtual inventory manager may either be a separate program or integrated with the shared inventory donation manager 130. The shared inventory items may be represented as pointers or references to the shared inventory item that is stored at a remote inventory source. The virtual inventory manager may be considered an abstraction layer between traditional means of connecting data among servers and a virtual universe simulator-specific graphical user interface (GUI). The means of connecting data among servers may include network file system (NFS) applications, structured query language (SQL), file transfer protocol (ftp), a services-oriented architecture (SOA) request, or other methodologies. A particular shared inventory item may be stored at any inventory source within the shared inventory donation system 100, including on a donation database 132 or a universe database 110. The virtual inventory manager may thus access the particular shared inventory item from its original location and provide it to a shared inventory donation manager 130 and/or virtual universe simulator 102 so that a user may borrow the shared inventory item from a pack avatar regardless of the original location of the shared inventory item.

Various non-limiting examples may serve to further illustrate the disclosed shared inventory donation system 100. In one example, a corporation may create a wearable shared inventory item (a bracelet in this example) that is marked available for donation. Any avatar (and thus user) that would like to use the bracelet may then borrow it within the VU and the acquisition and usage of the bracelet by the various avatars is tracked by the shared inventory donation manager 130. The shared inventory donation manager 130 may then determine a donation amount based on the tracked usage, such as by donating one dollar to a cancer charity for each avatar that borrows the donated bracelet and is wearing the bracelet at noon on a particular day. Records may also be kept to provide to taxing authorities such as the Internal Revenue Service and users may be notified that the donation is made. The disclosed system accordingly provides an efficient method of providing donated shared inventory items and determining donation amounts s based on tracked usage, providing benefits to donating organizations (i.e., convenient charitable donations), charitable organizations (i.e., as receipts of donations), users (i.e., provide for donations to desired organizations), and VU operators (i.e., an additional feature to offer to users and content providers).

Figure 2:
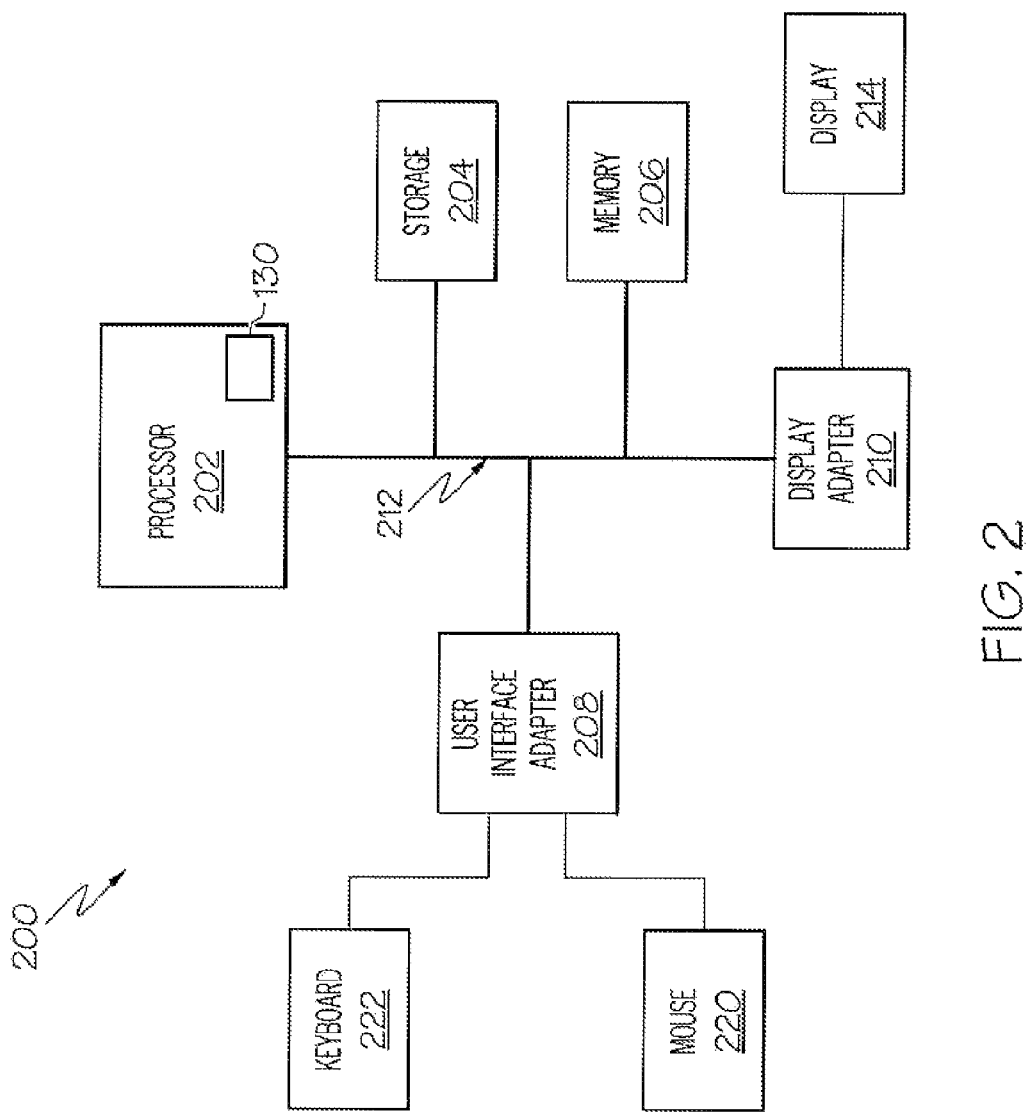
FIG. 2 depicts a block diagram of one embodiment of a computer system suitable for use as a component of the shared inventory donation system, such as a client computer system or a data processing system to execute the shared inventory donation manager.

FIG. 2 depicts a block diagram of one embodiment of a computer system 200 suitable for use as a component of the shared inventory donation system 100, such as a client computer system 106 or a data processing system to execute the shared inventory donation manager 130. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the shared inventory donation manager 130, such as by receiving requests to donate shared inventory items or tracking usage of donated shared inventory items, and may temporarily or permanently store information during its calculations or results after calculations in storage 204 or memory 206. All or part of the shared inventory donation manager 130, for example, may be stored in memory 206 during execution of its routines. Similarly, processor 202 may execute instructions for the VU interface 112 when computer system 200 is used for a client computer system 106.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a client computer system 106 attempting access to a donated shared inventory item, for example, may utilize the keyboard 222 and mouse 220 to interact with their computer system. The bus 212 may also connect the processor 202 to a display 214, such as an LCD display or CRT monitor, via the display adapter 210.

FIG. 3 depicts a conceptual illustration of software components of a shared inventory donation manager 130 according to some embodiments. The shared inventory donation manager 130 may be implemented on a computer system 200 such as described in relation to FIG. 2, including on one or more servers. The shared inventory donation manager 130 may also alternatively be implemented as part of a virtual universe simulator 102 (i.e., executing on the same servers as the virtual universe simulator 102 as one of its components). As described previously and also in relation to FIGS. 4 and 5, the shared inventory donation manager 130 may manage donated shared inventory items and donations based on tracked usage for one or more virtual universe simulators 102 (and thus one or more virtual universes). The shared inventory donation manager 130 may include components to assist it with its functions, including a user interface module 302, a VU simulator interface module 304, a content provider interface module 306, a donor module 310, and a borrower module 312. One of ordinary skill in the art will recognize that the functionality of each component of the shared inventory donation manager 130 and any of their sub-components may be combined or divided in any fashion and the description herein is merely intended to be illustrative of some embodiments.

The user interface module 302 may facilitate communication to and from a user, including transmitting and receiving information associated with lending a donated shared inventory item to a user as well as information associated with the user's usage of the shared inventory item. The user interface module 302 may also transmit reports, thank you notes, notifications that a particular item is available or that a donation has been made, or other messages to users. The VU simulator interface module 304 may facilitate communication to and from virtual universe simulators 102, such as by receiving notification of user sessions being established and requests for stored donated shared inventory items and by transmitting shared inventory items or metadata to a virtual universe simulator 102. The VU simulator interface module 304 may also receive information associated with usage of donated shared inventory items by users according to some embodiments. The content provider interface module 306 may facilitate communication to and from content providers or others who provide or request that shared inventory items be made available for donation. The content provider interface module 306 may thus receive requests to make shared inventory items available for donation from content providers, where the requests may include conditions such as limits on which users can borrow the item, how long they may borrow the item, or charitable contribution associated with types of borrowing. The content provider interface module 306 may also transmit indications of determined donations to donee organizations (i.e., donating content providers).

The donor module 310 may perform various tasks associated with managing and tracking donated shared inventory items. The donor module 310 may include its own components, such as a content tagging module 312, a tracking module 314, a reporting module 316, and a donee communication module 318. The content tagging module 312 may "tag" shared inventory item content to mark it as available for donation. According to some embodiments, the content tagging module 312 may mark shared inventory content as donated by generating and storing metadata associated with, the donated items such that the metadata is accessible when the donated shared inventory items are rendered, borrowed, or otherwise accessed.

Metadata may include information relating to sharing of shared inventory items, including donated shared inventory items, with users. Metadata may be associated with a particular inventory item using any type of methodology. Metadata may, for example, mark an item for sharing by all, for sharing with particular users, for auction, for baiter, etc. In yet another example, metadata may mark an inventory item by a rating, such as a compilation of user ratings for the item. This example may be useful in facilitating a user searching for inventory items that meet a desired standard of quality or popularity (e.g., a user may request all "five star" or "10 out of 10" rated items). Metadata may be persisted to a database (such as the inventory source of the item or the donation database 132) and may also be used for visual indication of whether an object is available for sharing. The use of metadata may allow for services such as scheduling policies for particular items, access control lists (ACLs) that allow for conditions to be imposed on the use of an item by particular users, expiration of borrowing terms, or any other service. One of ordinary skill in the art will recognize that metadata may be used to control or limit virtually every aspect of shared inventory items in a virtual universe.

Metadata may similarly be associated with a shared, inventory item that indicates that the given item is up for donation. Metadata may specify limits or conditions upon the use of the donated shared inventory item, such as a limited time of use, restriction to certain users or types of users, restriction to a type of use, etc. In some embodiments, metadata may also provide for the item being used for occasional non-charitable purposes, such as an item that becomes charitable only at certain times of the day. In other embodiments, metadata indicate the maximum duration of borrowing and whether permanent borrowing is permitted. In yet other embodiments, metadata may indicate whether a borrower may transfer a shared inventory item to another user. Switching between charitable statuses may be either via automatic or manual request. The content tagging module 314 may, upon receiving a request to mark a particular item as donated, determine the appropriate metadata or changes to metadata and request or perform the necessary changes to the metadata for the donated shared inventory item.

The tracking module 314 may track usage of the donated shared inventory items by borrowing users and may use the tracking to determine a donation amount resulting from tracked usage of the donated shared inventory items. In some embodiments, the tracking module 314 may receive usage information from the VU simulator 102 (via the VU simulator interface module 304). Usage information may include start and stop times for borrowing, the length of time the item was borrowed, how the item was used while it was borrowed, where the borrowing user was located within the VU while borrowing, whether the item was transferred to another user, or any other type of information. The tracking module 314 may use any type of methodology to determine the donation resulting from the tracked usage, such as basing a donation based on the number of users, the duration and/or extent of use, the types of users, start times, stop times, durations, or any other factors.

The reporting module 316 may generate and transmit reports based on determined donation amounts. In some embodiments, the reporting module 316 may transmit a report to the donor regarding the amount of the donation. Tax reports may also be generated by the reporting module 316 for submission to third-party accountants, taxing authorities, or other entities. Similarly, the donee communication module 318 may transmit donation information, or any other information, to a donee (i.e., the beneficiary of the donation).

The borrower module 320 may perform various tasks associated with user interactions for donated shared inventory items. The borrower module 320 may include its own components, such as a donated item retrieval module 322, a donated item search module 324, a conditions module 326, and a lending module 328. The donated item retrieval module 322 may enforce conditions or requests from administrators or content owners to terminate lending of donated shared inventory items. This may occur, for example, when a content owner ends a charitable fund raising drive and wishes to retrieve all of its shared inventory items within the VU. The donated item search module 324 may facilitate user searches for donated shared inventory items. A user may, for example, perform a query of what inventory items are being donated using the VU interface 112. A user may narrow their search in a variety of ways, such as by charitable organization or type of charity, geographic location of the donor, type of shared inventory item, user ratings, or other factors.

The conditions module 326 may determine whether a borrowing user has accepted borrowing terms and conditions for a donated shared inventory item before lending the donated shared inventory item to the user. To accomplish this, the conditions module 326 prompts a user with terms of use and requires acceptance of the terms via any type of input means. The lending module 328 may perform tasks associated with tending donated shared inventory items to users, such as by interacting with the VU simulator 102, transmitting thank you notes or notices of donations to borrowing users, or other tasks. In some embodiments, for example, a thank you note facility may be implemented such that a thank you note can be provided to borrowers, such as by a persistent field that stores a thank you message.

Figure 4:
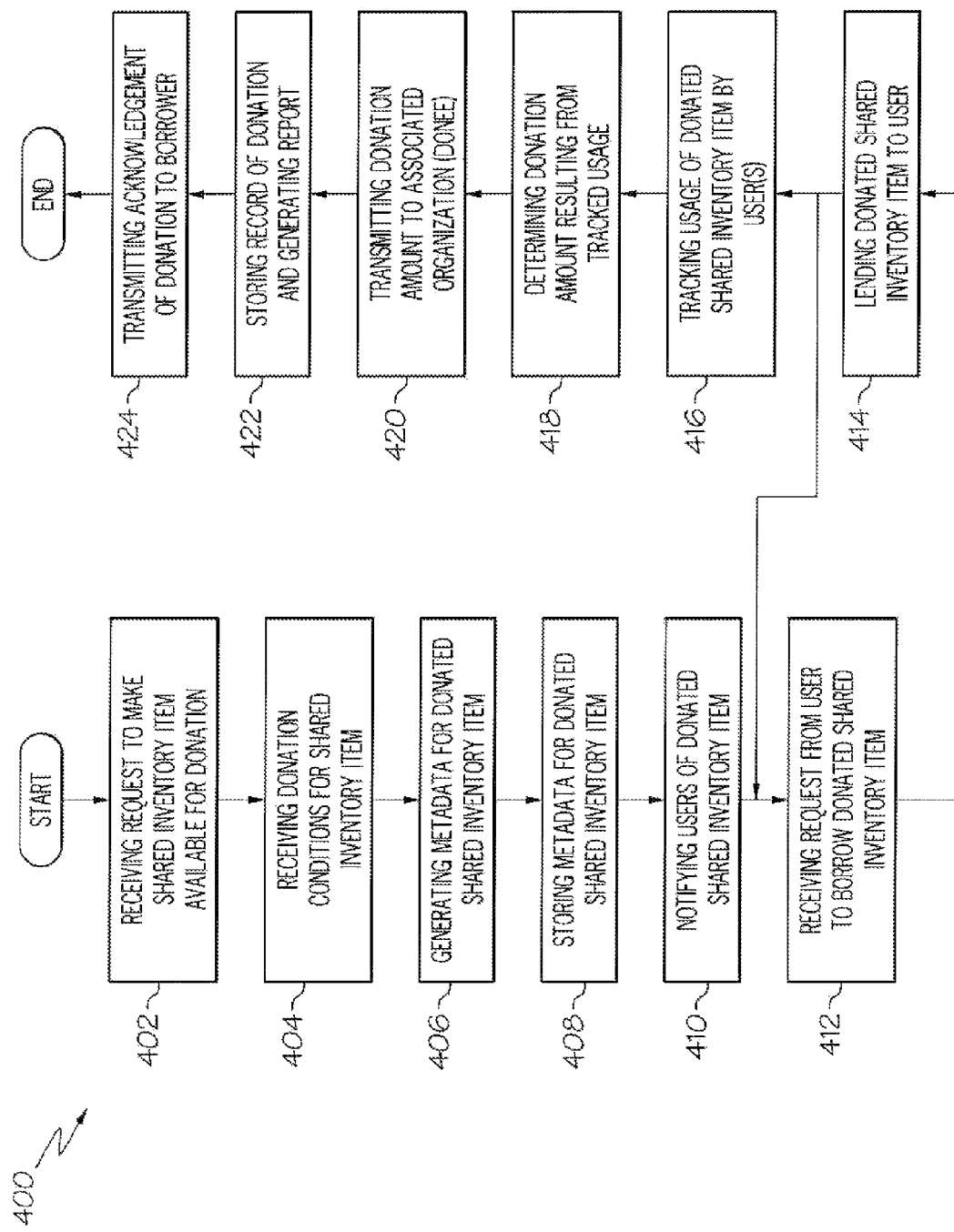
FIG. 4 depicts an example of a flow chart for managing donations of shared inventory items in a virtual universe according to some embodiments.

FIG. 4 depicts an example of a flow chart 400 for managing donations of shared inventory items in a virtual universe according to some embodiments. The method of flow chart 400 may be performed, in one embodiment, by the shared inventory donation manager 130 and its components. Flow chart 400 begins with element 402, receiving a request to make a shared inventory item available for donation. The request may be received from an owner of the shared inventory item or an administrator in some embodiments. At optional element 404, donation conditions for the shared inventory item may also be received. In some embodiments, the donation conditions may be included as part of the request of element 402.

The content tagging module 312 may at element 406 generate the metadata for the shared inventory item to be donated and may, at element 408, store the generated metadata. At element 410, users may be optionally notified that the new donated shared inventory item is available. Otherwise, users may find the new donated shared inventory item via queries or other means. The shared inventory donation manager 130 may at element 412 receive a request from a user to borrow the donated shared inventory item. If lending the shared inventory item to the requesting user is permitted, the shared inventory donation manager 130 may at element 414 lend the item to the user.

The tracking module 314 may at element 416 track usage of the donated shared inventory items by any users who have borrowed the item. At optional element 418, the tracking module 314 may determine the donation amount resulting from the tracked usage, as described previously. An indication of the determined donation amount may be transmitted at element 420 to the beneficiary or donee organization that is associated with the donated shared inventory item. At element 422, a record of the donation and the amount of donation may be stored and a report about the usage and donation may be generated (and optionally passed to taxing authorities, administrators, the donor, the donee, etc.). At element 424, an optional acknowledgement and thank you may be transmitted to the users who borrowed the donated shared inventory item, after which the method may terminate.

Figure 5:
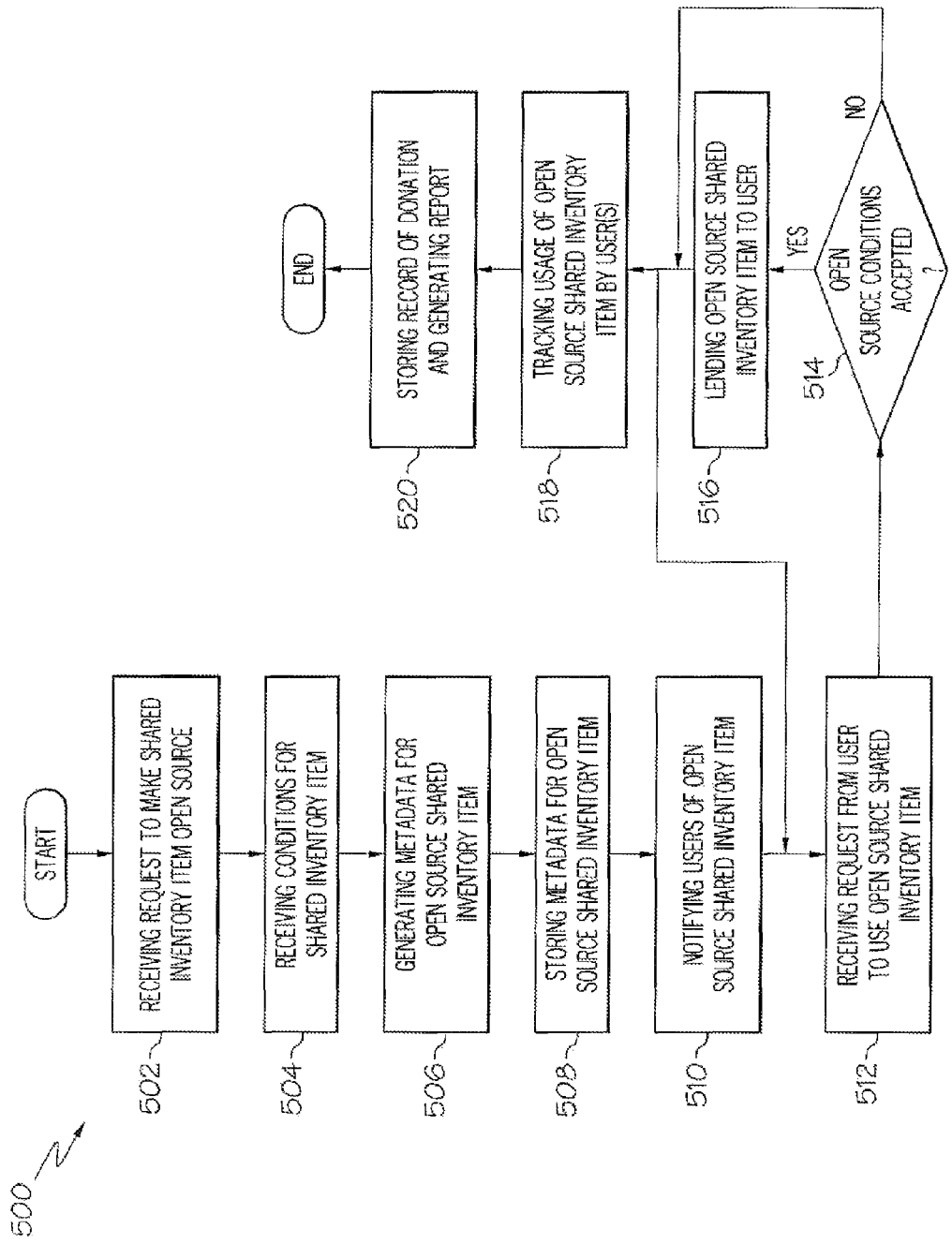
FIG. 5 depicts an example of a flow chart for managing donations of open source shared inventory items in a virtual universe according to some embodiments.

FIG. 5 depicts an example of a flow chart 500 for managing donations of open source shared inventory items in a virtual, universe according to some embodiments. The method of flow chart 500 may be performed, in one embodiment, by the shared inventory donation manager 130 and its components. The flow chart of FIG. 5 describes an alternative embodiment to that of FIG. 4 where the donated shared inventory item is an open source inventory item. In this embodiment, a donation may not be made to a donee, but the management and tracking mechanisms of the disclosed embodiments may prove useful in managing open source software. Flow chart 500 begins with element 502, receiving a request to make a shared inventory item available as open source. The request may be received from an owner of the shared inventory item or an administrator in some embodiments. At optional element 504, open source donation conditions for the shared inventory item may also be received. In some embodiments, the open source donation conditions may be included as part of the request of element 502.

The content tagging module 312 may at element 506 generate the metadata for the shared inventory item to be made open source and may, at element 508, store the generated metadata. The metadata may indicate, for example, that the open source shared inventory item may be permanently borrowed. At element 510, users may be optionally notified that the new open source shared inventory item is available. The shared inventory donation manager 130 may at element 512 receive a request from a user to use the open source shared inventory item. At decision block 514, it is determined whether the user has accepted any open source conditions (e.g., an open source license). If the user has accepted the open source conditions (or no conditions are required), the method continues to element 516, lending the open source shared inventory item to the requesting user.

The tracking module 314 may at element 518 track usage of the open source shared inventory items by any users who are using the item. At element 520, a record of the open source donation may be stored and a report about the usage and donation may be generated (and optionally passed to taxing authorities, administrators, the donor, the donee, etc.), after which the method may terminate.

Figure 6:
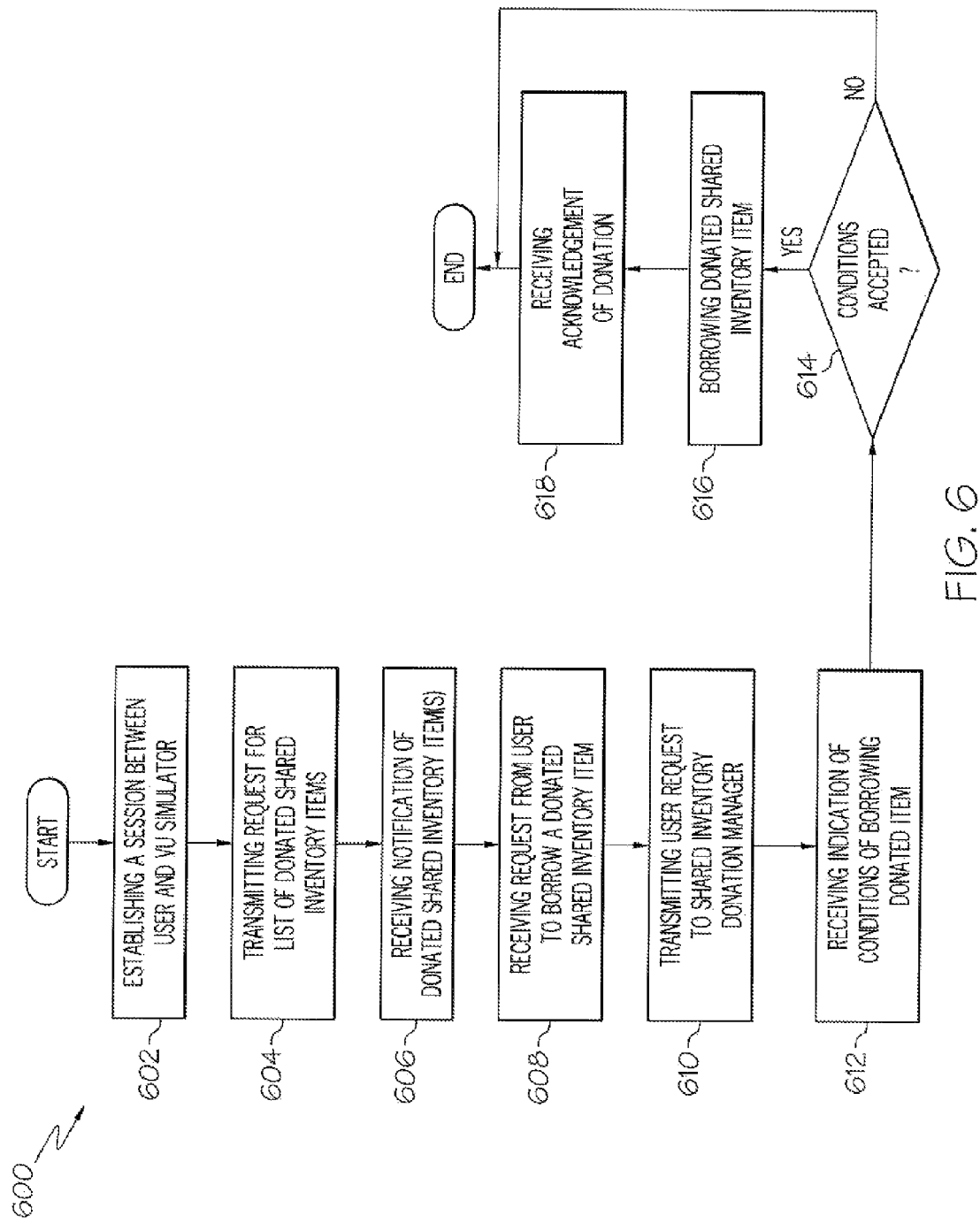
FIG. 6 depicts an example of a flow chart for borrowing a donated shared inventory item in a virtual, universe according to some embodiments.

FIG. 6 depicts an example of a flow chart 600 for borrowing, a donated shared inventory item in a virtual universe according to some embodiments. The method of flow chart 600 may be performed, in one embodiment, by a user utilizing a VU interlace 112 of a client computer system 106. Flow chart 600 begins with element 602, establishing a session between a user and the virtual universe simulator 102. In some embodiments, establishing a user session will involve the user providing authentication information (such as a password and user id) and the virtual universe simulator 102 authenticating the user and establishing the session. At element 604, a request for a list of available donated shared inventory items may be transmitted and, at element 606, notification of available donated shared inventory items may be received. Elements 604 and 606 may be performed in response to a user query for available donated items according to some embodiments. In other embodiments, notification may be received at element 606 when a new donated shared inventory item is made available.

At element 608, a request from a user to borrow a donated shared inventory item may be received. A user may request to borrow such an item in any fashion, such as selecting it with their avatar, selecting it via a user interface, or other means. In some embodiments, a list of inventory items for the user may include both donated shared inventory items as well as inventory items owned by the user. The donated shared inventory items may optionally be indicated as shared by some means, such as an asterisk next to their name in the list or other visual indication of their status. The user may at element 606 request the user of a particular inventory item and, at element 608, the virtual universe simulator 102 will render at the client computer system 106 the inventory item if permitted, as described previously. From the point of the view of the user, using a permitted shared inventory item should be the same experience as using their own items according to some embodiments, providing a seamless use of shared inventory items by the user. The request may then be transmitted at element 610 to the shared inventory donation manager 610. In some embodiments, an indication of conditions of borrowing the donated item may be received at element 612, such as an open source license that most be accepted. The conditions may be presented to the user and, if accepted at decision block 614, the donated shared inventory item may be borrowed at element 616. An acknowledgement of the donation, such as a thank you note, may be received at element 618, after which the method may terminate.

In some alternative embodiments, a user may have the ability to transfer a borrowed shared inventory item to another user (where such use is permitted). This ability may be particularly useful for charitable organizations which may serve as a "clearing house" or "middleman" between a donator and donee by receiving borrowed shared inventory items and transferring them to those in need. Many other applications may also benefit from transfer of a borrowed item, such as by allowing users to give borrowed shared inventory items as gifts.

It will be apparent to those skilled in the art having the benefit of this disclosure that the present invention contemplates methods, systems, and media for managing donations of shared inventory items in a virtual universe. It is understood that the form of the invention shown and described in the detailed description and the drawings are to be taken merely as examples. It is intended that the following claims be interpreted broadly to embrace all the variations of the example embodiments disclosed.

What is claimed is:

1. A method for managing donations of shared inventory in a virtual universe, the method comprising the steps of:
  a computer system receiving a request to make a shared inventory item available for donation, wherein the request to make the shared inventory item available for donation comprises a condition for borrowing the shared inventory item;
  the computer system, in response to the step of receiving the request to make the shared inventory item available for donation, marking the shared inventory item as available for donation, wherein the step of marking the shared inventory item as available for donation comprises generating and storing metadata associated with the shared inventory item;
  the computer system, after the step of marking the shared inventory item as available for donation:
    presenting a list identifying inventory items to a user, wherein the list identifies donated shared inventory items and inventory items owned by the user;
    receiving a request from a first user to borrow the shared inventory item; and
    receiving a request from a second user to borrow the shared inventory item;
  the computer system, in response to the step of receiving the request from the first user:
    creating one of a copy of a file from an inventory source or a reference to the shared inventory item; and
    presenting an indication of the condition for the borrowing the shared inventory item to the first user;
  the computer system, in response to the step of presenting the indication of the condition, receiving an acceptance of the condition from the first user;
  the computer system, in response to the step of receiving the acceptance of the condition from the first user, lending the shared inventory item to the first user;
  the computer system, after the step of receiving the request from the second user, lending the shared inventory item to the second user so that the first user and the second user are simultaneously borrowing the shared inventory item; and
  the computer system tracking usage of the shared inventory item by the first and second users.

2. The method of claim 1, further comprising notifying users of the virtual universe that the shared inventory item is available for donation.

3. The method of claim 1, further comprising determining a donation amount resulting from the step of tracking usage of the shared inventory item by the first and second users.

4. The method of claim 3, further comprising transmitting an indication of the donation amount to a donee organization associated with the shared inventory item.

5. The method of claim 3, further comprising transmitting an indication of the donation amount to the first and second users.

6. The method of claim 3, further comprising generating and transmitting a report based on the donation amount.

7. The method of claim 1, wherein the shared inventory item is an open source shared inventory item.

8. The method of claim 1, further comprising:
the computer system, in response to receiving a user request, querying an identity of a particular user for a particular inventory item; and
the computer system rendering an answer to the user request.

9. The method of claim 1, further comprising the computer system transferring the shared inventory item from the second user to a third user.

10. A computer program product for managing donations of shared inventory in a virtual universe, the computer program product comprising:
one or more computer-readable tangible storage devices;
program instructions, stored on at least one of the one or more storage devices, for a computer system to receive a request to make a shared inventory item available for donation, wherein the request to make the shared inventory item available for donation comprises a condition for borrowing the shared inventory item;
program instructions, stored on at least one of the one or more storage devices, for the computer system, in response to performing the program instructions to receive the request to make the shared inventory item available for donation, to mark the shared inventory item as available for donation, wherein the program instructions to mark the shared inventory item as available for donation generate and store metadata associated with the shared inventory item;
program instructions, stored on at least one of the one or more storage devices, for the computer system, after performing the program instructions to mark the shared inventory item as available for donation, to:
present a list identifying inventory items to a user, wherein the list identifies donated shared inventory items and inventory items owned by the user;
receive a request from a first user to borrow the shared inventory item; and
receive a request from a second user to borrow the shared inventory item;
program instructions, stored on at least one of the one or more storage devices, for the computer system, in response to performing the program instructions to receive the request from the first user, to:
create one of a copy of a file from an inventory source or a reference to the shared inventory item; and
present an indication of the condition for the borrowing the shared inventory item to the first user;
program instructions, stored on at least one of the one or more storage devices, for the computer system, in response to performing the program instructions to present the indication of the condition, to receive an acceptance of the condition from the first user;
program instructions, stored on at least one of the one or more storage devices, for the computer system, in response to performing the program instructions to receive the acceptance of the condition from the first user, to lend the shared inventory item to the first user;
program instructions, stored on at least one of the one or more storage devices, for the computer system, after performing the program instructions to receive the request from the second user, to lend the shared inventory item to the second user so that the first user and the second user are simultaneously borrowing the shared inventory item; and
program instructions, stored on at least one of the one or more storage devices, for the computer system to track usage of the shared inventory item by the first and second users.

11. The computer program product of claim 10, further comprising program instructions, stored on at least one of the one or more storage devices, to notify users of the virtual universe that the shared inventory item is available for donation.

12. The computer program product of claim 10, further comprising program instructions, stored on at least one of the one or more storage devices, to determine a donation amount resulting from performing the program instructions to track usage of the shared inventory item by the first and second users.

13. The computer program product of claim 12, further comprising program instructions, stored on at least one of the one or more storage devices, to transmit an indication of the donation amount to a donee organization associated with the shared inventory item.

14. The computer program product of claim 12, further comprising program instructions, stored on at least one of the one or more storage devices, to transmit an indication of the donation amount to the first and second users.

15. The computer program product of claim 12, further comprising program instructions, stored on at least one of the one or more storage devices, to generate and transmit a report based on the donation amount.

16. The computer program product of claim 10, further comprising:
program instructions, stored on at least one of the one or more storage devices, for the computer system, in response to performing the program instructions to receive a user request, to query an identity of a particular user for a particular inventory item; and
program instructions, stored on at least one of the one or more storage devices, for the computer system to render an answer to the user request.

17. A computer system for managing donations of shared inventory in a virtual universe, the computer system comprising:
one or more processors, one or more computer-readable memories and one or more computer-readable tangible storage devices;
program instructions, stored on at least one of the one or more storage devices for execution by at least one of the one or more processors via at least one of the one or more memories, for the computer system to receive a request to make a shared inventory item available for donation, wherein the request to make the shared inventory item available for donation comprises a condition for borrowing the shared inventory item;
program instructions, stored on at least one of the one or more storage devices for execution by at least one of the one or more processors via at least one of the one or more memories, for the computer system, in response to performing the program instructions to receive the request to make the shared inventory item available for donation, to mark the shared inventory item as available for donation, wherein the program instructions to mark the shared inventory item as available for donation generate and store metadata associated with the shared inventory item;
program instructions, stored on at least one of the one or more storage devices for execution by at least one of the one or more processors via at least one of the one or more memories, for the computer system, after performing the program instructions to mark the shared inventory item as available for donation, to:
  present a list identifying inventory items to a user, wherein the list identifies donated shared inventory items and inventory items owned by the user;
  receive a request from a first user to borrow the shared inventory item; and
  receive a request from a second user to borrow the shared inventory item;
program instructions, stored on at least one of the one or more storage devices for execution by at least one of the one or more processors via at least one of the one or more memories, for the computer system, in response to performing the program instructions to receive the request from the first user, to:
  create one of a copy of a file from an inventory source or a reference to the shared inventory item; and
  present an indication of the condition for the borrowing the shared inventory item to the first user;
program instructions, stored on at least one of the one or more storage devices for execution by at least one of the one or more processors via at least one of the one or more memories, for the computer system, in response to performing the program instructions to present the indication of the condition, to receive an acceptance of the condition from the first user;
program instructions, stored on at least one of the one or more storage devices for execution by at least one of the one or more processors via at least one of the one or more memories, for the computer system, in response to performing the program instructions to receive the acceptance of the condition from the first user, to lend the shared inventory item to the first user;
program instructions, stored on at least one of the one or more storage devices for execution by at least one of the one or more processors via at least one of the one or more memories, for the computer system, after performing the program instructions to receive the request from the second user, to lend the shared inventory item to the second user so that the first user and the second user are simultaneously borrowing the shared inventory item; and
program instructions, stored on at least one of the one or more storage devices for execution by at least one of the one or more processors via at least one of the one or more memories, for the computer system to track usage of the shared inventory item by the first and second users.

18. The computer system of claim 17, further comprising program instructions, stored on at least one of the one or more storage devices for execution by at least one of the one or more processors via at least one of the one or more memories, to notify users of the virtual universe that the shared inventory item is available for donation.

19. The computer system of claim 17, further comprising program instructions, stored on at least one of the one or more storage devices for execution by at least one of the one or more processors via at least one of the one or more memories, to determine a donation amount resulting from performing the program instructions to track usage of the shared inventory item by the first and second users.

20. The computer system of claim 19, further comprising program instructions, stored on at least one of the one or more storage devices for execution by at least one of the one or more processors via at least one of the one or more memories, to transmit an indication of the donation amount to a donee organization associated with the shared inventory item.

21. The computer system of claim 17, further comprising:
  program instructions, stored on at least one of the one or more storage devices for execution by at least one of the one or more processors via at least one of the one or more memories, for the computer system, in response to performing the program instructions to receive a user request, to query an identity of a particular user for a particular inventory item; and
  program instructions, stored on at least one of the one or more storage devices for execution by at least one of the one or more processors via at least one of the one or more memories, for the computer system to render an answer to the user request.

* * * * *